United States Patent [19]
Williams

[11] 3,730,431
[45] May 1, 1973

[54] METHOD AND APPARATUS FOR HERBICIDE APPLICATION IN ROW CROPS

[75] Inventor: David M. Williams, Salinas, Calif.

[73] Assignee: Bruce Church, Inc., Salinas, Calif.

[22] Filed: May 10, 1971

[21] Appl. No.: 141,709

[52] U.S. Cl. ..................239/1, 239/159, 239/162
[51] Int. Cl. ...........................B05b 17/00, B44d 1/08
[58] Field of Search........................239/1, 159, 162; 42/1.7; 222/176

[56] References Cited

UNITED STATES PATENTS

| 2,301,213 | 11/1942 | Kang | 239/162 |
| 2,580,145 | 12/1951 | White | 47/1.7 |
| 2,701,664 | 2/1955 | Thompson | 222/176 |
| 2,731,295 | 1/1956 | Snow | 239/159 |
| 3,438,575 | 4/1969 | Rohling | 239/1 |
| 3,467,278 | 9/1969 | Williams | 221/1 |

*Primary Examiner*—Lloyd L. King
*Attorney*—George J. Netter and Kendrick, Subkow & Kriegel

[57] ABSTRACT

A wheeled chassis including dispensing equipment for row planting is also provided with three sets of herbicide dispensers: one for applying a herbicide between rows; a second for synchronous herbicide application in the rows between planting sites; and a third for synchronous application of a different herbicide onto the planting sites.

6 Claims, 4 Drawing Figures

PATENTED MAY 1 1973

INVENTOR
DAVID M. WILLIAMS

BY
KENDRICK, SUBKOW & KRIEGEL

George J. Netter
ATTORNEYS

METHOD AND APPARATUS FOR HERBICIDE APPLICATION IN ROW CROPS

BACKGROUND OF THE INVENTION

Herbicides of many different kinds and properties have been developed for use with planted crops to control weeds. Some prevent the growth of substantially any kind of plant including the planted product, whereas others are more selective and will prevent weed growth while having little effect upon the crop. Also, certain herbicides will have an effect depending upon the strength used, i.e., if used in high strength it may be damaging to the crop, whereas if used in a diluted form, little effect is produced on the crop itself, but it will be successful against weeds.

Application of herbicides in the past has been, in the simplest and most commonly used method, by simply broadcasting or dispersing generally over the entire area, including rows of crops and the areas between the planted rows. Other techniques have consisted of applying the herbicide solely between crop rows and exempting the rows. Also, depending upon the type used, the herbicide would be either contained in a suitable carrier and then sprayed or broadcast on the surface of the ground, or, in other cases incorporated into the soil at some particular depth especially selected for best operation of the herbicide. In all of the various known techniques there have been one or more deficiencies making them not completely satisfactory.

For optimally successful use of herbicides in connection with planted crops where the crops are located in rows at periodically spaced points, a number of factors must be considered. First of all, the herbicide to be applied at the site of the planted crop must be either in a sufficiently diluted form or of a character that will make it relatively harmless to the crop. Moreover, it must be kept in mind that if a rather powerful herbicide is used, say between crop rows, that where crops are rotated on the field, the selected herbicide used must not be injurious to crops that will be planted in succeeding years. All known past techniques and apparatus for disseminating herbicide materials have either failed completely or were only partially successful in solving one or more of the above problems.

OBJECTS OF THE INVENTION

An object of this invention is to provide improved method and apparatus for applying herbicides to planted row crops at preselected areas.

Another object of the invention is the provision of method and apparatus for applying two or more herbicides at preselected areas of a planted row crop field.

Yet another object of the invention is the provision of method and apparatus for applying a first herbicide at the crop sites and a second herbicide between crop sites.

A further object of the invention is the provision of method and apparatus for dispensing a first herbicide between planting rows, a second herbicide onto crop sites and a third herbicide in the row between crop sites.

These and other objects and advantages of the invention will be apparent to those skilled in the art after a consideration of the following detailed description, taken in conjunction with the accompanying drawings, in which the preferred form of the invention is illustrated.

DESCRIPTION OF A PREFERRED EMBODIMENT

Although the method and apparatus of the subject invention may be practiced with a number of different kinds of planting apparatus, it will be specificially described herein in connection with the planting method and apparatus disclosed in U.S. Pat. No. 3,467,278 issued Sept. 16, 1969 to D. M. Williams. As described therein, the method and apparatus accomplishes the planting of seeds at predetermined locations along with a mass of vermiculite and, optionally, fertilizer. More particularly, the seeds to be planted are gravity fed from a hopper to a substantially horizontal portion of an outlet tube. At the appropriate time a pulse or blast of pressurized air ejects a measured quantity of seeds into a furrow. Simultaneously, a predetermined amount of vermiculite is gravity fed into a horizontal compartment in which it is also ejected along with the quantity of seeds to form a common mass in the furrow. Subsequently, the vermiculite-seed mass may be sprayed with a liquid fertilizer and/or an asphalt stabilizer. Yet another aspect of the patent method and apparatus is the provision of a plurality of such apparatus disposed transversely of other furrows with timed commutation effecting planting of adjacent furrows in a staggered arrangement.

In the patented apparatus and method referred to in the immediately preceding paragraph, seeds, vermiculite and fertilizer as well as a stabilizer are all provided at the same planting location and it is to be understood that the herbicide application techniques described herein may be used with any apparatus or method providing any or all of the preceding. That is, it may be that the apparatus with which the herbicide application techniques of this invention are used may also be used to plant seeds or they may plant seeds and fertilizer, or seeds, fertilizer, vermiculite and stabilizer as in the above referenced patent.

Figure 2:
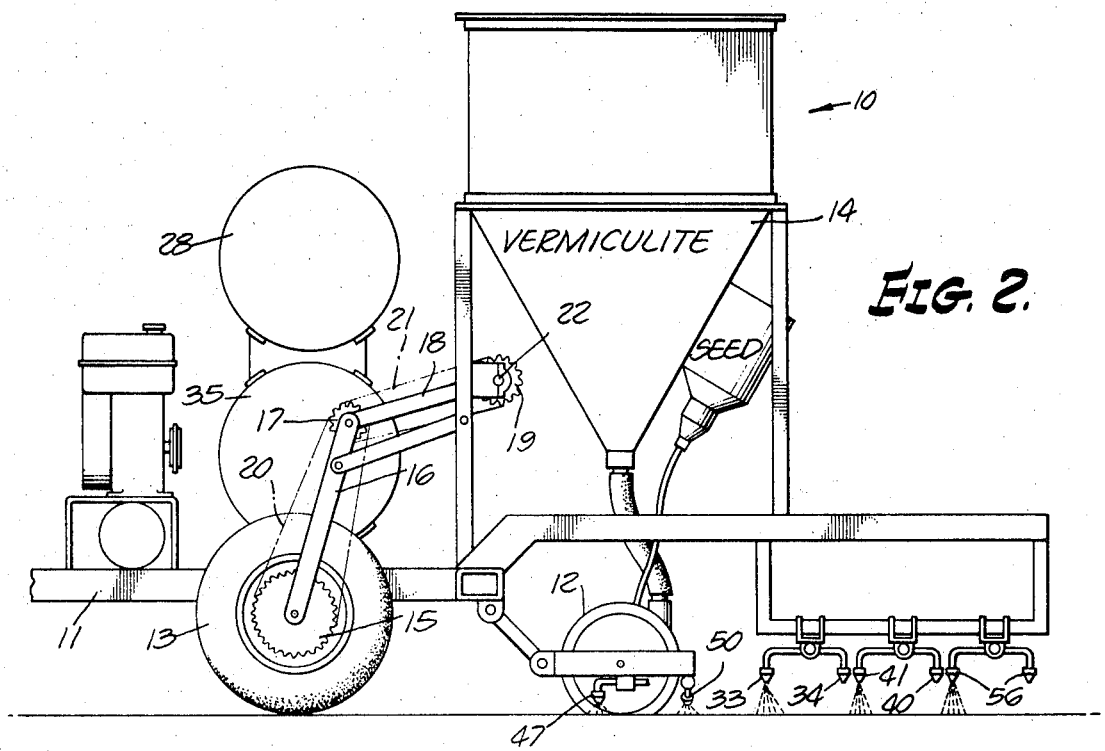
FIG. 2 is a side elevational view of apparatus constructed in accordance with one embodiment of the present invention.

The apparatus of the subject invention is referenced generally as at 10 in FIG. 2. The entire apparatus 10 is carried on a chassis 11 which may be pulled across the field during use by a tractor (not shown), for example. A pair of disc openers 12 suitably suspended from the chassis 11 are provided for each seed dispenser and, thus, for each individual set of herbicide applicators to be described.

Figure 1:
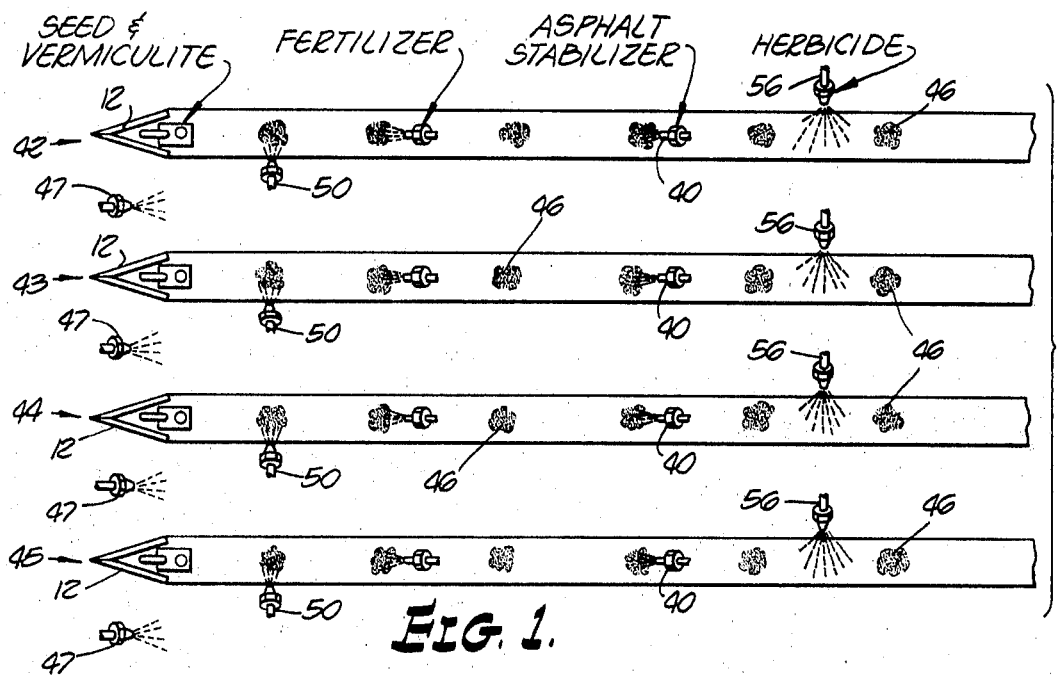
FIG. 1 is a plan, schematic view of the application of herbicides in accordance with the present invention relative to a plurality of planting rows.

The chassis 11 and associated equipment mounted thereon are supported on a pair of wheels 13, only one of which is shown in FIG. 1. Optionally, the chassis may be supported by a further pair of wheels, not shown, which are symmetrically disposed below a vermiculite hopper 14 and in longitudinal alignment with the first wheels 13. A still further pair of wheels may be employed at each end of the hopper 14, if desired.

A sprocket 15 is affixed to the axle for the wheel 13 to rotate therewith. Via a linkage 16 the sprocket 15 drives a second sprocket 17 which in turn via a similar linkage 18 drives a third sprocket 19. The sprocket 17 is a double sprocket and receives a chain 20 from sprocket 15 and a further chain 21 from the sprocket 19. The sprocket 19 is keyed to and drives a synchronizing shaft 22 for accomplishing timed dispensing of the various materials attendant a complete planting operation including the dispensing of herbicides in accordance with the present invention.

Although planting may be accomplished in a number of different rows simultaneously by the apparatus described herein and more particularly set forth in the above referenced patent, as shown in FIG. 1 the machine 10 will be considered in conjunction with planting and selective application of herbicides in four adjacent furrows synchronously. However, detailed discussion will be confined to the planting in two adjacent furrows or rows since the use in additional rows or furrows will be identical.

A pair of commutators 23 and 24, driven by the shaft 22, are employed to energize two different solenoid valves 25 and 26, respectively, for dispensing seeds and vermiculite at a predetermined spacing arrangement as particularly described in the patent. That is, on actuation of the solenoid valves 25 and 26 a blast of pressurized air from a supply tank 27 serves to eject a measured quantity of seed and vermiculite to a common planting location in the associated row or furrow.

Figure 3:
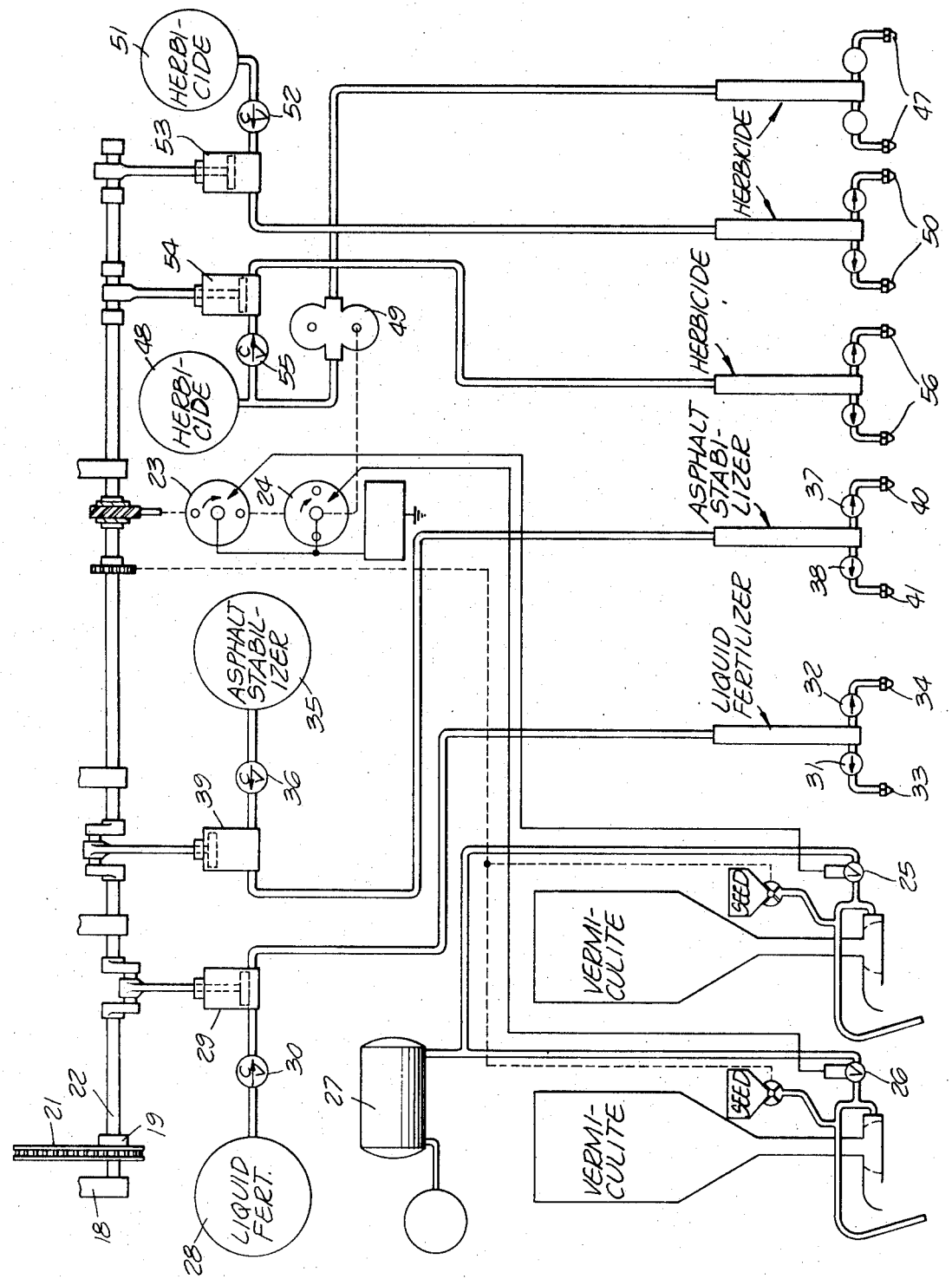
FIG. 3 is a schematic view of the machine apparatus shown in FIG. 2.

Still referring to FIG. 3 liquid fertilizer stored in a tank 28 is dispensed by a positive displacement pump 29 which draws the fertilizer from the tank through a check valve 30 at which time check valves 31 and 32 are closed. After the pump 29 is filled the fertilizer is then forced thereout through the check valves 31 and 32 for dispensing to the two planting rows via nozzles 33 and 34, respectively.

A stabilizer such as an emulsion of asphalt and water is dispensed from a tank 35 through a check valve 36 and further check valves 37 and 38 through the action of a positive displacement pump 39 which can be identical to the pump 29 used for the fertilizer dispensing. A pair of outlet nozzles 40 and 41 respectively direct the asphalt stabilizer to the appropriate planting sites.

As shown in FIG. 3, the positive displacement pumps 29 and 39 are synchronously operated by rotation of the shaft 22.

The method and apparatus described to this point are all disclosed in the above referenced patent and by virtue of which synchronized dispensing of seed, vermiculite, fertilizer and asphalt stabilizer are provided in a plurality of rows or furrows as particularly shown in FIG. 1. That is, as depicted there, four planting rows or furrows 42 through 45, each include a plurality of planting locations or sites 46 located at predetermined spaced intervals along the furrow at which seed, vermiculite, fertilizer and asphalt stabilizer have been provided. And, as will be more particularly gone into at this time, herbicides of selected kinds will be provided onto the planting locations, between planting locations in each row or furrow, and between furrows or rows to prevent the growth of weeds.

In the application of herbicides to row crops there are three areas that must be considered: at the planting sites 46; the unused area between sites 46 in the row or furrow that is planted; and in the non-seeded region between adjacent rows or furrows. Depending upon a number of factors, the herbicide may be the same for all three locations or it may be different. For example, the herbicide which is used between the planting rows and that which is used between planting locations in a given row can be fairly non-discriminatory in its killing properties. On the other hand, the herbicide which is used at the sites for the crop must obviously not be destructive or inhibit crop growth. In still further cases, a diluted herbicide may be satisfactory for use at the planting sites, whereas a stronger concentration of the same herbicide may be used at the other locations. In any of these cases, care must be taken in the selection of the herbicide with an eye toward crops to be planted in subsequent years, since although the selection and/or dilutions used may be suitable for the particular crop being planted that year, it should also be considered whether or not it would be deteriorative to later crops.

A first set of herbicide spray nozzles 47 are provided mounted onto the frame adjacent to the disc openers 12 and oriented such that they will direct the spray between rows 42–45 as shown in FIGS. 1 and 2. That is, this set of nozzles 47 are for directing herbicide onto the relatively large areas between adjacent planting rows. Location of the nozzles 47 adjacent the disc openers 12 reduces undesired lateral dissemination of the spray as, for example, could occur in the case of a cross wind during planting. This latter feature is important in that the herbicide chosen for spraying between planting rows will be a stronger one and could damage the planted crop. Turning again to FIG. 3, a quantity of a first liquid herbicide 48 through the action of a pump 49 driven by the shaft 22 provides a continuous supply of herbicides for dissemination via the nozzles 47. No synchronizing of spraying is required for these nozzles since the location between planting rows is a continuous expanse.

A second set of herbicide dispensing nozzles 50 are located to the rear of the disc openers 12 as shown in FIG. 2 and slightly to the side of the planting rows 42-45 for directing the spray onto the planting sites 46. As shown in FIG. 3, the nozzles 50 are provided with a synchronized pulsing dissemination of herbicide from a tank 51 of a suitable herbicide via a check valve 52 by a positive displacement pump 53 which is driven from the synchronizing shaft 22. In this manner, the herbicide 52, especially chosen for use at the crop planting location, provides a timed spray of the herbicide as the equipment passes each planting location.

For the final herbicide dispensing, a further positive displacement pump 54 draws liquid herbicide from the tank 48 through a check valve 55 to provide dissemination at a synchronized rate via nozzles 56. As depicted in FIG. 1, nozzles 56 are vertically located outwardly of each furrow or planting row and are directed inwardly toward the row to dispense the herbicide onto the planting row. Also, due to the synchronizing action of the pump 54, dissemination via the nozzles 56 is between planting sites 46. The purpose in locating the nozzles 56 outwardly of the row is that as the nozzles pass over the planting sites, even though they are turned off, there will still be some drippings which could drop onto the newly planted areas 46 and could thereby be detrimental to the growth of the planted crop. However, with the nozzles laterally spaced from the furrow or row, any droppings will land between adjacent rows and not endanger the crop.

Figure 4:
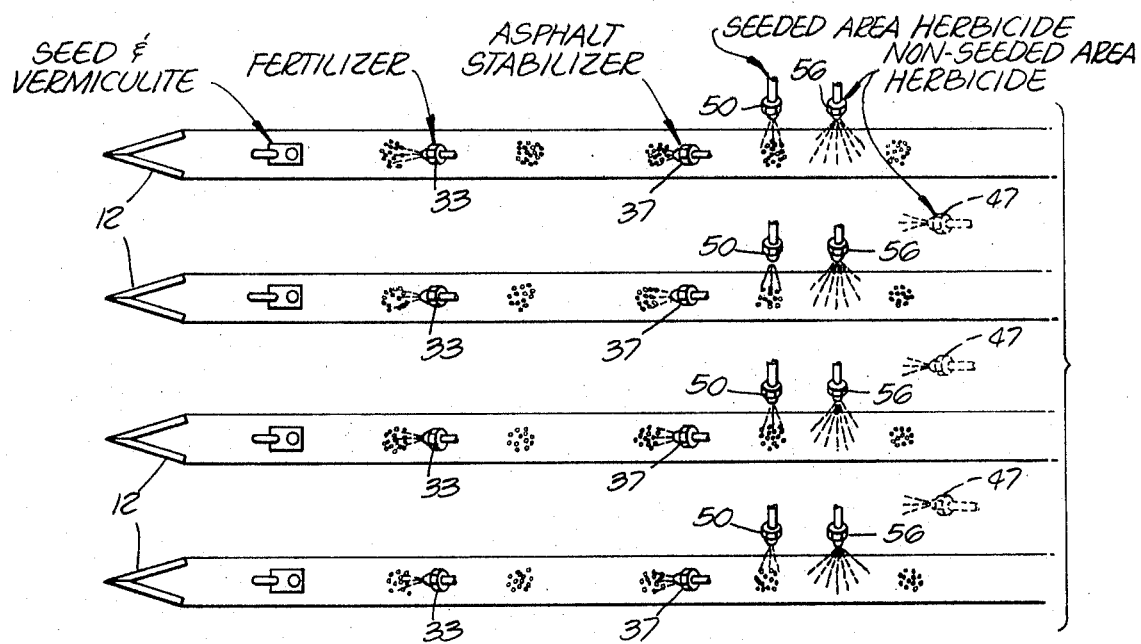
FIG. 4 is a plan, schematic view of another form of the invention.

An alternative form of the invention is depicted in FIG. 4 in which the seeded area herbicide nozzles 50 are located immediately to the rear of the stabilizer applicators. Next, are the non-seeded area nozzles 56 located outwardly of the rows, as before, for directing spray between planting sites in the rows. As to the nozzles 47 for spraying between rows, they are the last of all the applicators, herbicide and planting. Synchronized operation is as in the first described embodiment and can be accomplished with the apparatus shown in FIG. 3.

In the described embodiments, it was assumed that two different herbicides were used, one in the container 48 for application to the non-seeded areas and a second in the container 51 for application directly onto newly planted areas. It is also within the contemplation of the invention to have three different herbicides, one for the crop, one for the non-seeded areas between the crop but lying in the same furrow or planting row, and a third for application to the non-seeded area between the planting rows. Also, when different herbicides are referenced herein, this is intended to include chemically different materials or the same herbicide in different dilutions.

As previously described, the apparatus of this invention is contemplated as carried on a chassis, the entire assembly being pulled across the field during use by a tractor, for example. It is also contemplated that the herbicide dispensing apparatus could be mounted on a hitch arrangement directly onto a tractor with power for operating the pumps and commutator apparatus being taken directly from the output shaft of the tractor engine. Synchronization of operation would be the same as in the first described embodiment.

What is claimed is:

1. A method of applying at least two different liquid herbicides onto a row crop field, which comprises:
   moving a wheeled machine carrying pressurized supplies of said herbicides through the field in a direction parallel to the crop rows;
   spraying a first herbicide onto the ground between rows and between crop plantings in the rows; and
   spraying a second herbicide onto the crop.

2. A method as in claim 1, in which the first herbicide is sprayed continuously between rows and intermittently between crop plantings in the rows.

3. A method of applying liquid herbicides to the ground surface while depositing seeds from a planting machine at spaced locations within rows, said machine continuously moving generally parallel to the planting rows, which comprises:
   directing a first spray of herbicide onto the ground between rows;
   directing a second herbicide spray of the same herbicide as in said first spray onto the planting rows;
   directing a third herbicide spray onto the planting rows; and
   periodically interrupting said second spray to exclude spraying of said deposited seeds therewith and said third spray to exclude spraying between deposited seeds.

4. Apparatus for applying different liquid herbicides to the ground surface of a row crop field from a machine moving through said field along the direction of the rows, comprising:
   first spray nozzle means carried by said machine directed downwardly toward the ground between rows for spraying a first herbicide thereon;
   second spray nozzle means carried by said machine and located between crop rows, said nozzle means laterally directed to spray said first herbicide onto the crop row;
   third spray nozzle means carried by said machine for spraying the crop rows with a further herbicide; and
   means for synchronizingly controlling the second spray nozzle means to spray only between crop plantings and the third spray nozzle means to spray only on the crop planting.

5. Apparatus as in claim 4, in which means are provided at the side of said first spray nozzle means to prevent lateral dissemination of the spray therefrom onto the crop rows.

6. A method of applying fluid herbicide to the ground surface of a row crop planting field which comprises:
   moving a wheeled chassis carrying supplies of first and second herbicides through the field parallel to the crop rows;
   pressurizing said supplies of herbicides; directing a spray of said first herbicide onto the ground between planting rows;
   directing individual pressurized sprays of said first and second herbicides onto the rows; and
   commutating the sprays of first and second herbicides directed onto the planting rows such that the first herbicide is deposited between crop plantings and the second herbicide is deposited onto the crop planting.

* * * * *